(12) United States Patent
Taylor

(10) Patent No.: US 6,331,871 B1
(45) Date of Patent: *Dec. 18, 2001

(54) SYSTEM FOR PRODUCING TIME-INDEPENDENT VIRTUAL CAMERA MOVEMENT IN MOTION PICTURES AND OTHER MEDIA

(75) Inventor: Dayton V. Taylor, New York, NY (US)

(73) Assignee: Digital Air, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/698,428

(22) Filed: Oct. 27, 2000

Related U.S. Application Data

(63) Continuation of application No. 08/909,233, filed on Aug. 11, 1997, now Pat. No. 6,154,251, which is a continuation of application No. 08/362,653, filed on Dec. 21, 1994, now Pat. No. 5,659,323.

(51) Int. Cl.[7] .................................................. H04N 7/18
(52) U.S. Cl. ............................................................. 348/159
(58) Field of Search ................................. 348/38, 39, 44, 348/85, 86, 121, 244, 133, 159; H04N 7/18

(56) References Cited

U.S. PATENT DOCUMENTS

| | | |
|---|---|---|
| 2,298,476 * | 10/1942 | Goldsmith .............................. 348/36 |
| 3,225,651 | 12/1965 | Clay . |
| 3,482,913 | 12/1969 | Glenn, Jr. . |
| 3,508,920 | 4/1970 | Glenn, Jr. . |
| 3,518,929 | 7/1970 | Glenn, Jr. . |
| 3,598,355 * | 8/1971 | English ................................. 354/293 |
| 3,682,064 | 8/1972 | Matsunaga et al. . |
| 4,037,950 | 7/1977 | Lo et al. . |
| 4,062,045 | 12/1977 | Iwane . |
| 4,158,487 | 6/1979 | Collender . |
| 4,239,359 | 12/1980 | Morioka . |
| 4,333,715 | 6/1982 | Brooks . |
| 4,698,682 * | 10/1987 | Astle .................................... 348/584 |
| 5,004,335 | 4/1991 | Montes . |
| 5,013,147 | 5/1991 | Montes . |
| 5,022,727 | 6/1991 | Smith et al. . |
| 5,049,987 | 9/1991 | Hoppenstein . |
| 5,184,732 * | 2/1993 | Ditchburn et al. ..................... 348/91 |
| 5,223,925 | 6/1993 | Hattori . |
| 5,237,353 | 8/1993 | Montes . |
| 5,359,363 | 10/1994 | Kuban et al. . |
| 5,497,188 * | 3/1996 | Kaye .................................... 348/36 |

OTHER PUBLICATIONS

Pictures Worth A Thousand Cameras, Scientific American (p. 46), Nov. 1996.*
Virtual Camera Movement: The Way of the Future?, American Cinematograppher (pp. 93–100), Jun. 1998.*
"If You Want Something Done Right . . . ", Millimeter (p. 19), Jun. 1998.*

(List continued on next page.)

Primary Examiner—Nhon T. Diep
(74) Attorney, Agent, or Firm—Dorr, Carson, Sloan & Birney, P.C.

(57) ABSTRACT

A system for producing virtual camera motion in a motion picture medium in which an array of cameras is deployed along a preselected path with each camera focused on a common scene. Each camera is triggered simultaneously to record a still image of the common scene, and the images are transferred from the cameras in a preselected order along the path onto a sequence of frames in the motion picture medium such as motion picture film or video tape. Because each frame shows the common scene from a different viewpoint, placing the frames in sequence gives the illusion that one camera has moved around a frozen scene (i.e., virtual camera motion). In another embodiment, a two-dimensional array of video cameras is employed. Each camera synchronously captures a series of images in rapid succession over time. The resulting array of images can be combined in any order to create motion pictures having a combination of virtual camera motion and time-sequence images.

13 Claims, 10 Drawing Sheets

OTHER PUBLICATIONS

Dayton Taylor's Timetrack Camera, Purple Prose (pp. 42–45), Jun. 1998.*

"Freeze–Frame Filming in 3–D", Time Digital (p. 12), Jun. 1998.*

"Roger Ebert's Top 20 Movie Sites", Yahoo Internet Life (p. 86). Jan. 1998.*

The Camera, Life Library of Photography, Time–Life Books, p. 158, 1970.*

"Virtual Camera Rebuttal," American Cinematographer, p. 10, Oct. 1996.*

Dayton Taylor, "BBC Tomorrow's World", Timetrack Research Tape, May 12, 1993, Digital Air, Inc./Dayton Taylor.

Dayton Taylor, Paul Simon "The Boy In The Bubble" excerpts, Timetrack Research, circa 1981–1982, Digital Air, Inc./Dayton Taylor.

"Pictures Worth A Thousand Cameras", Scientific American (p. 46).

Virtual Camera Movement: The Way of the Future?, American Cinematographer (pp. 93–100).

"If You Want Something Done Right . . . ", Millimeter (p.19).

"Dayton Taylor's Timetrack Camera", Purple Prose (pp. 42–45).

"Freeze–Frame Filming in 3–D", Time Digital (p. 12).

"Roger Ebert's Top 20 Movie Sites", Yahoo Internet Life (p. 86).

The Camera, Life Library of Photography, Time Life Books, p. 158.

"Virtual Camera Rebuttal,"American Cinematographer, p. 10.

* cited by examiner

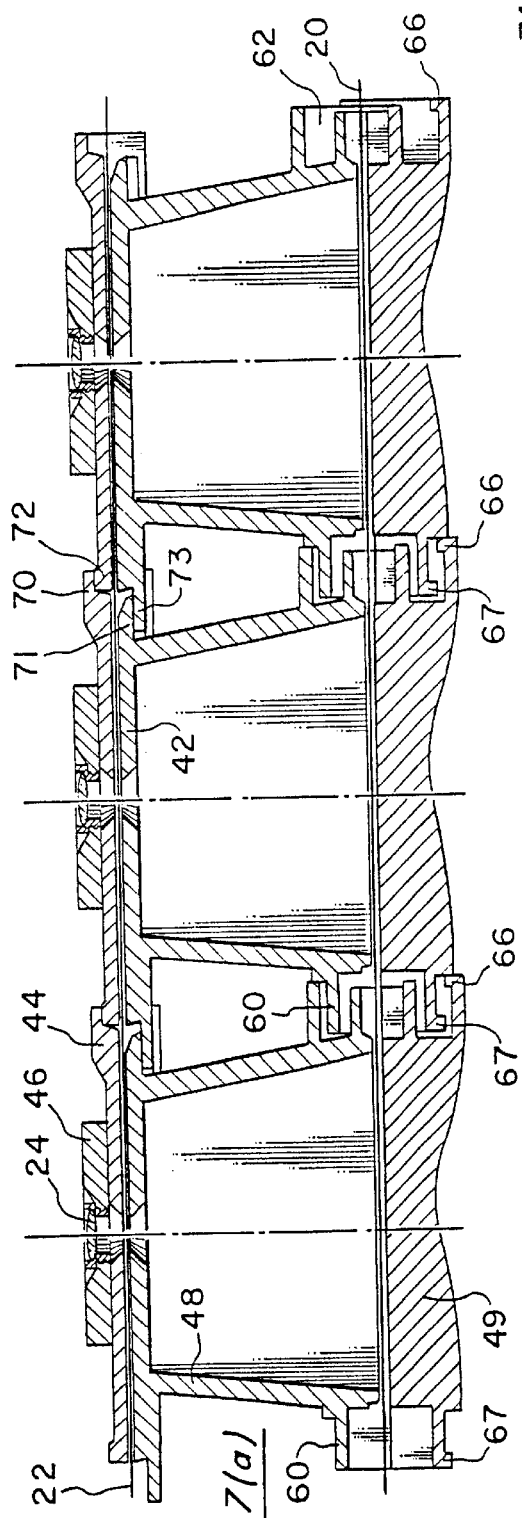
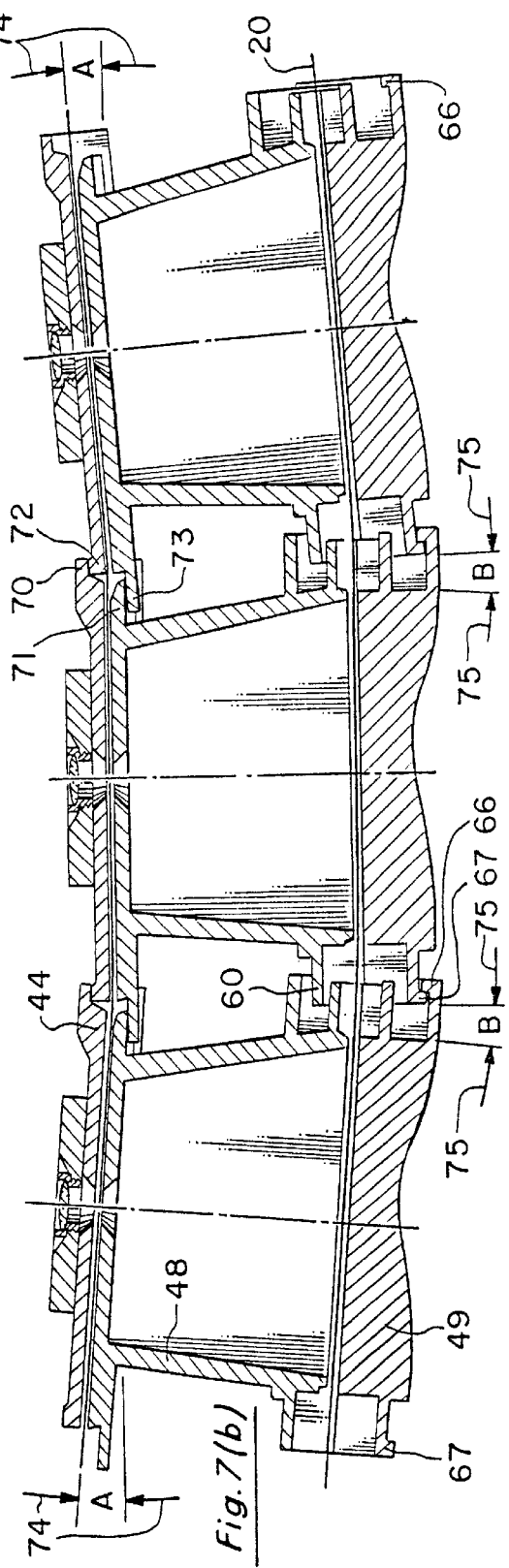
Fig. 7(a)
Fig. 7(b)

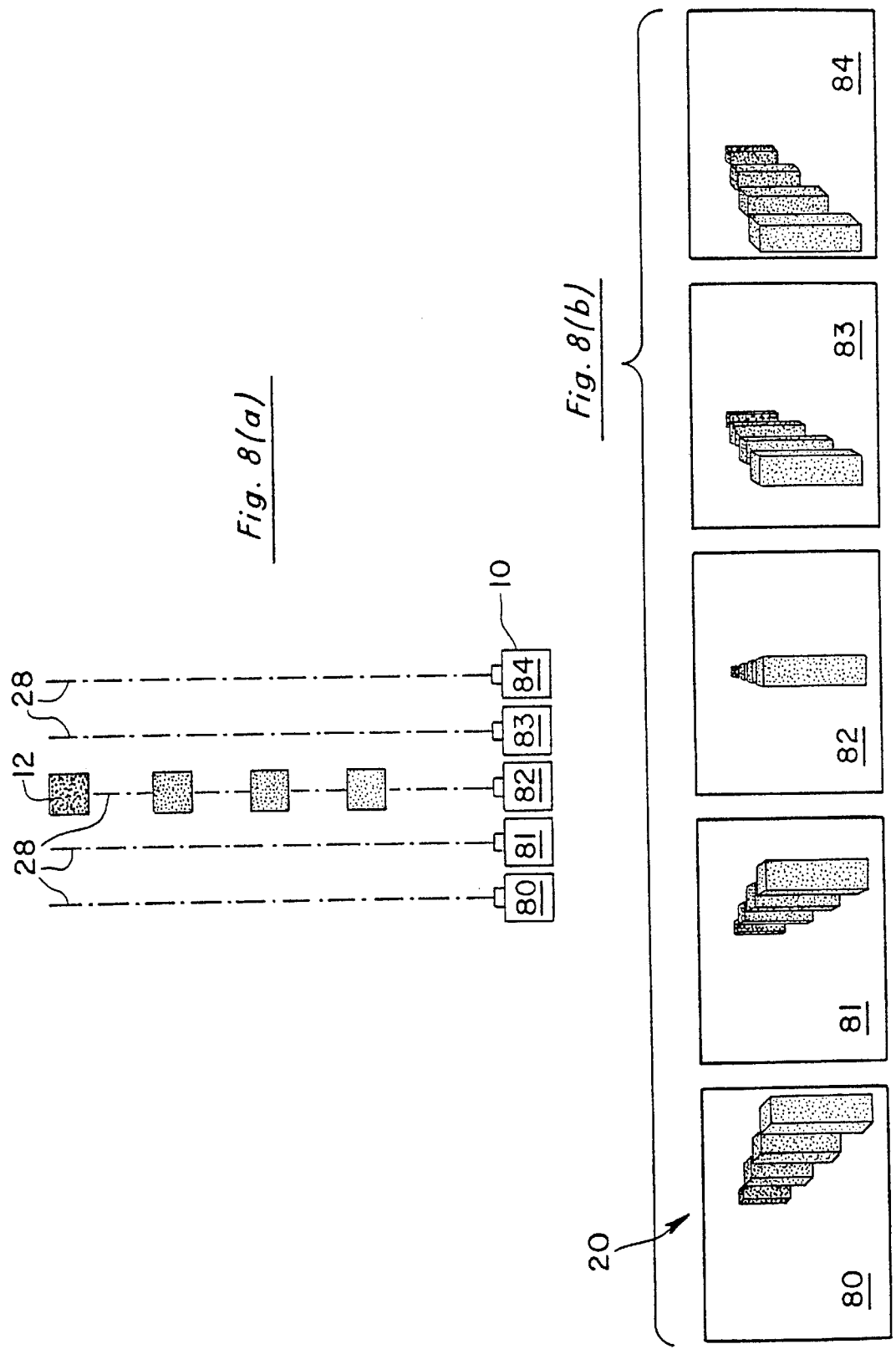

SYSTEM FOR PRODUCING TIME-INDEPENDENT VIRTUAL CAMERA MOVEMENT IN MOTION PICTURES AND OTHER MEDIA

RELATED APPLICATIONS

This application is a continuation of the applicant's U.S. patent application Ser. No. 08/909,233, entitled "System For Producing Time-Independent Virtual Camera Movement In Motion Pictures And Other Media," filed on Aug. 11, 1997, now U.S. Pat. No. 6,154,251 which is a continuation of U.S. patent application Ser. No. 08/362,653 filed on Dec. 21, 1994, now U.S. Pat. No. 5,659,323, issued on Aug. 19, 1997.

FIELD OF THE INVENTION

The present invention relates generally to the field of cinematography. More specifically, the present invention discloses a system for producing motion picture scenes that embody time-independent virtual camera movement. An array of specialized modular cameras simultaneously records photographic images of a scene and the resulting photographic images are placed in a motion picture medium and viewed in succession, conveying the illusion that a single camera has moved around a scene frozen in time.

STATEMENT OF THE PROBLEM

Presently, film directors wishing to convey a sense of time passing for the viewer of a scene while time appears stopped for the subject of the same scene, such as might be required in films with science-fiction themes, often find it desirable to freeze the action in the scene while recording the scene with a moving motion picture camera. Scenes so recorded convey the sense of time passing for the viewer, as is naturally inferred from the camera movement, while time appears stopped for the subject.

Freezing the scene artificially is generally done by making models of any subjects within the scene that would otherwise be in fluid motion and directing actors in the scene to freeze. This method of freezing a scene is obviously limited in scope by a number of factors, particularly if the scene is intended to contain dramatic action. Such factors include the model-maker's ability to portray objects such as fluid properties in motion and the actors' ability to pose without moving. This method is further limited if the scene is documentary in nature, if it involves extensive use of fluids, pyrotechnics, smoke, airborne objects, or other dynamic properties, or if one of the actors is a young child or an animal. In these latter cases, freezing the action artificially is often impossible.

Another, simpler, method of creating the illusion that time has stopped in a motion picture scene is the freeze-frame. The freeze-frame is an effect achieved by repeating a single frame of camera negative over a series of adjacent frames of a projection print. The resulting composite motion picture image contains absolutely no motion. The freeze-frame is used by some film directors to stop time, usually at a time in the motion picture after the viewer has become accustomed to the general motion and passage of time. By stopping time, the director allows the viewer to reflect on the events that lead up to the stopped moment, as well as the specific drama of that particular moment in time. The freeze-frame, however, is incapable of capturing camera movement, and therefore fails to convey the illusion that time has stopped for the subject of the motion picture but not for the viewer.

Although subjects have been photographed simultaneously throughout this century for the purpose of recording photographs in three dimensions (i.e., stereo photography), the prior art does not teach or suggest methods of simultaneous photography for the purpose of creating special time-stopping effects in otherwise conventional motion picture scenes. Nor does the prior art teach or suggest a system for producing virtual camera movement from a sequence of simultaneous still photographs.

Multiphotographic systems for producing three-dimensional images have been used in the past in a wide variety of other fields, including the following:

| Inventor | Patent No. | Issue Date |
| --- | --- | --- |
| Clay | 3,225,651 | Dec. 28, 1965 |
| Glenn, Jr. | 3,482,913 | Dec. 9, 1969 |
| Glenn, Jr. | 3,508,920 | Apr. 28, 1970 |
| Glenn, Jr. | 3,518,929 | July 7, 1970 |
| Matsunaga et al. | 3,682,064 | Aug. 8, 1972 |
| Lo et al. | 4,037,950 | July 26, 1977 |
| Iwane | 4,062,045 | Dec. 6, 1977 |
| Collender | 4,158,487 | June 19, 1979 |
| Morioka | 4,239,359 | Dec. 16, 1980 |
| Brooks | 4,333,715 | June 8, 1982 |
| Montes | 5,004,335 | Apr. 2, 1991 |
| Montes | 5,013,147 | May 7, 1991 |
| Hoppenstein | 5,049,987 | Sep. 17, 1991 |
| Hattori | 5,223,925 | June 29, 1993 |
| Montes | 5,237,353 | Aug. 17, 1993 |

Clay, U.S. Pat. No. 3,225,651, discloses a method and apparatus for reproducing a panoramic scene as a three-dimensional image. A plurality of cameras are arranged so that their axes are slightly divergent, with each adjacent pair of cameras producing adjacent stereoscopic images. The images are projected on a special screen consisting of a number of horizontally adjacent viewing cells. The view appears to the audience as a three-dimensional panorama without the use by the audience of special glasses or other assistance.

Glenn, Jr., U.S. Pat. No. 3,482,913, discloses a method for composing and enlarging three-dimensional pictures using a number of projectors each of which is independently adjustable in position and in illumination to provide a high-quality three-dimensional picture.

Glenn, Jr., U.S. Pat. No. 3,508,920, discloses a method for printing high-resolution three-dimensional pictures by producing half-tone pictures in which the width of the half-tone dots is equal to the width of the picture elements and the length of the half-tone dots is several times their width.

Glenn, Jr., U.S. Pat. No. 3,518,929, discloses a camera for producing three-dimensional pictures having a plurality of camera units 11 with a common film spool shaft 21 and shutter drive 40. Each camera unit 11 has its own film guide 19, supply 27, take-up 22 spools, and shutter 16.

Matsunaga et al., U.S. Pat. No. 3,682,064, disclose an apparatus for stereographically photographing a scene using a plurality of cameras placed at diverse vantage points relative to the scene. The apparatus includes means for setting the shutter speed for each camera and for either synchronizing or delaying the starting time of the shutter for each camera.

Lo et al., U.S. Pat. No. 4,037,950, disclose a method and apparatus to determine and coordinate the variables that bear on the quality of a stereoscopic picture, such as the size of the picture, the distance between adjacent camera vantage points, the camera focal length and the distance from the camera to an element or object in the scene which is to lie in the plane of the picture.

Iwane, U.S. Pat. No. 4,062,045, describes a system for producing three-dimensional television images in which a plurality of television cameras are arranged side-by-side in a straight line or arc, and the pictures obtained from the cameras are connected to form an angular division distribution pattern from which a three-dimensional image is produced.

Collender, U.S. Pat. No. 4,158,487, shows a method and apparatus to display both stationary and moving stereoscopic pictures without the need for the observers to use viewing aids.

Morioka, U.S. Pat. No. 4,239,359, discloses a method by which an image of an object is projected on a mass to enable the mass to be sculpted into a replica of the original object.

Brooks, U.S. Pat. No. 4,333,715, discloses a display structure that can present either two-dimensional or three-dimensional images to a viewer by sequentially activating particular lamps or electrodes to illuminate certain images while leaving unactivated images unobservable. The effect of three-dimensional motion is achieved by sequentially illuminating layers of images in varying positions.

Montes, U.S. Pat. No. 5,004,335, shows an apparatus for projecting moving three-dimensional pictures in which the projecting surface emits each photon in a direction determined by the incidence of that photon on the surface. The images for projection are obtained by a series of motion-picture cameras placed adjacent to each other along a straight line.

Montes, U.S. Pat. No. 5,013,147, discloses an optical system for three-dimensional reproduction of images in which the images are obtained as described above for Pat. No. 5,004,335 and the images are displayed by projection on a screen consisting of one layer having vertical cylindrical lenses and a second layer having horizontal cylindrical lenses.

Hoppenstein, U.S. Pat. No. 5,049,987, discloses an apparatus for dividing a visual image into separate image strips, transmitting the separate strip images as a composite image, and recreating the visual image as a three-dimensional image by use of a lenticular lens.

Hattori, U.S. Pat. No. 5,223,925, shows an autostereoscopic system that consists of a series of television cameras arranged horizontally that send their images to similarly arranged image output screens that project inverted parallax images through a series of lenses consisting of a first convex lens and then a large Fresnel convex lens.

Montes, U.S. Pat. No. 5,237,353, discloses a system for taking, reproducing, and projecting three-dimensional still or moving pictures in which the pictures are taken by groups of two cameras arranged so that their lenses are at right angles and have a semitransparent plate disposed therebetween at a 45-degree angle. The pictures obtained from these groups of cameras are arranged on a single piece of film, which can then be copied or projected, the projection necessitating the use of one-third as many projection lenses as cameras.

In addition to the multiphotographic systems for producing three-dimensional images discussed above, prior art exists in the field of image processing for electronically simulating the pan, tilt, rotation, and zoom characteristics of a conventional camera using a single image. For example, U.S. Pat. No. 5,359,363 of Kuban et al. discloses a omni-view motionless camera surveillance system that uses a wide angle lens to capture a circular image of an entire field of view in the memory of the device. High speed electronic circuitry can then be employed to view and manipulate a region of interest within the image. The device can accomplish the functions of pan, tilt, rotation, and zoom throughout the field of view without the need for any mechanical mechanisms to move the camera.

SOLUTION TO THE PROBLEM

None of the prior art references uncovered in the search show a system for freezing a scene in a moving picture while providing the illusion that the camera is moving in space three dimensionally around the frozen image. The present invention solves this problem by deploying an array of cameras along a preselected path, with each camera focused on a common scene. The cameras simultaneously record a plurality of still images of the scene, and the images thus recorded are transferred in a preselected order to a sequence of frames in a motion picture medium, such as motion picture film or video tape. Because each frame shows the common scene from a different viewpoint, placing the frames in sequence gives the illusion that one camera has moved around a frozen scene (i.e., virtual camera motion). The direction of motion depends on the preselected path chosen, which may be a straight line or any type of curve over which the array of cameras can be deployed.

Although multiple simultaneous synchronous motion picture cameras are found in the prior art for the purpose of recording three-dimensional motion pictures, none of the prior art references provide a system for combining virtual camera motion (as described above) with motion picture images showing time progression of the scene. A second embodiment of the present invention employs a two-dimensional array of video cameras, each of which synchronously captures a series of images in rapid succession over time. The resulting array of images can be combined in any order to create motion pictures having any desired combination of virtual camera motion and time-sequence images.

SUMMARY OF THE INVENTION

The present invention provides a system for recording virtual camera movement with respect to a subject at a fixed instant in time. The system uses an array of specialized modular cameras capable of simultaneously recording a number of photographic images of a scene from a number of laterally disposed positions. The system thus produces a series of still photographs that, when viewed in rapid succession as a motion picture, convey the illusion of lateral camera movement with respect to the recorded scene, while the subject of the recorded scene appears stopped in time.

In one embodiment, the system is formed of a number of still cameras designed to couple with one another so as to provide a continuous light-tight path for a length of photographic film to pass through the entire assemblage of cameras across each camera's focal plane. The system further has a shutter system capable of exposing the film inside all of the cameras simultaneously, light-tight connections for the film to pass to and from film magazines at each end of the assemblage of cameras, a system for advancing the film through the assemblage of cameras from one magazine to another, and a mechanism for moving the entire assemblage in any desired direction during the simultaneous exposure event. Alternatively, an array of video still cameras can be used. The images obtained are subsequently sequentially arranged in a preselected order onto a sequence of frames on motion picture film or video tape. When the motion picture medium is viewed, it appears as though the scene has frozen in time, while the camera appears to move around the frozen subject or scene. In another embodiment, an array of video cameras is used. Each camera in the array synchronously captures a series of images in rapid succession over time. The resulting array of images can be combined and sequenced in any order to create motion pictures having a combination of virtual camera motion and time-sequence images.

A primary object of the present invention is to provide a system that is able to freeze a scene in a motion picture yet provide the illusion of camera movement with respect to the frozen scene.

Another object of the invention is to provide a system that is capable of combining virtual camera motion with motion picture images showing time progression of the scene.

Yet another object of the present invention is to provide a system for freezing a scene in a motion picture in which the images comprising the frozen scene embody a blur caused by the movement of the cameras while recording the frozen scene. The motion blur smooths the transition from frame to frame when the motion picture image is reconstituted for viewing by the human eye.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIGS. 7(a) and 7(b) are cross-sectional views of a series of cameras of the present invention in straight (a) and curved (b) configurations.

FIGS. 8(a) and (b) show the series of images produced by the cameras of the present invention.

DETAILED DESCRIPTION OF THE INVENTION

Figure 1:
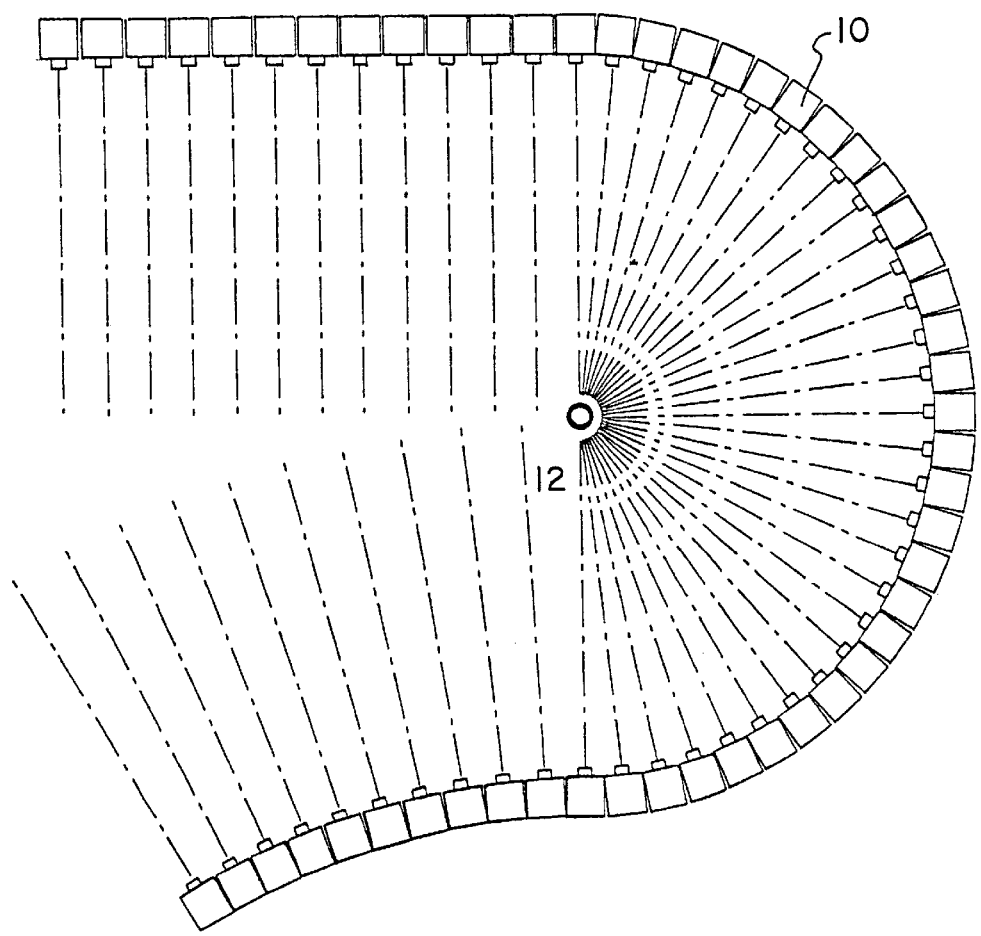
FIG. 1 is a top plan view of a lateral array of cameras of the present invention.

Turning to FIG. 1, an array of cameras 10 of the present invention is seen focused on a common scene 12. A scene 12 as used in this description is not limited to a single point or object but comprehends an entire view or area. The cameras 10 are deployed as desired to achieve a certain effect along a preselected path, for example, a straight line, a concave arcuate path, or a convex arcuate path. As discussed in more detail below, the shape of the path chosen is limited only by the necessity to maintain a light-tight connection between adjacent cameras 10. As with many methods of recording motion pictures, the present invention can be implemented with both photographic film and videotape. Both means of recording motion pictures (photographic film or videotape) are based on the principle of recording and reconstituting multiple frames of still image information in rapid succession continuously over time. Therefore, references to photographic film and motion picture medium are used herein to refer to motion pictures recorded with both photographic emulsion and video recording and storing means, although distinctions between film and videotape are made throughout to indicate the preferred method. Accordingly, it should be evident that either still cameras, video cameras, or motion picture cameras can be used in the array of cameras 10 of the present invention.

Figure 2:
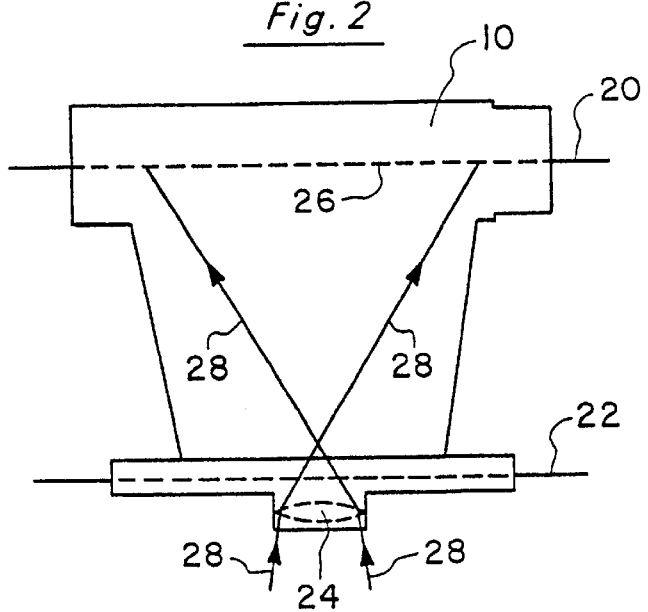
FIG. 2 is a cross-sectional view of one of the cameras of the present invention.

FIG. 2 shows a cross section of a single camera 10 of one embodiment of the present invention. The camera 10 is a simple box camera for obtaining still photographs. Light 28 enters the lens 24 and exposes the film 20 at the focal plane 26. A shutter 22 is used to control access of the light 28 to the film 20. It is to be understood that other types of cameras can be used in the present invention, as will be evident to those skilled in the art, for example, motion picture cameras or video cameras, and that the present invention is not meant to be limited to the description of the embodiment shown in FIG. 2.

Figure 3:
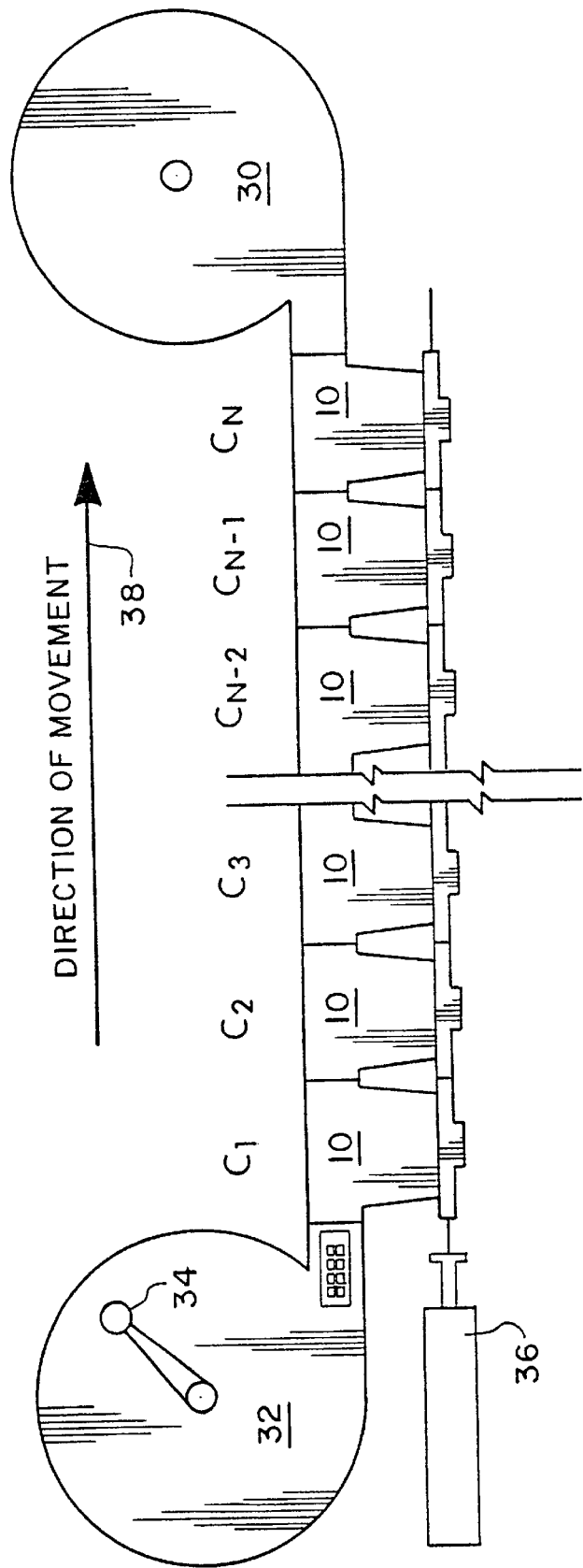
FIG. 3 is a top plan view of the present invention showing the lateral array of cameras and the film magazines and shutter trigger.

Illustrated in FIG. 3 is an overview of an array of cameras 10 in accordance with the present invention. A series of cameras 10, $C_1$ to $C_N$, are arrayed side-by-side. The number $C_N$ of cameras 10 can be varied to suit the needs of the effect one desires to obtain. The cameras 10 are flexibly connected such that a single strip of film 20 passes through all the cameras 10, as can be better appreciated by viewing FIGS. 7(a) and 7(b), and as is discussed in more detail below. The film 20 is stored in a first film magazine 30 at one end of the array of cameras 10 and taken up by a second film magazine 32 at the other end of the array of cameras 10. The take-up mechanism 34 can be any conventional mechanism used for taking up film, such as a hand-cranked or machine-driven reel. A shutter release 36 simultaneously controls the shutters 22 for all the cameras 10 in the array. In the preferred embodiment, the shutter release 36 is a mechanical spring-loaded pneumatic cylinder using a variable aperture exhaust port to retard the speed of the cocked spring pulling the shutter.

The entire array of cameras 10 of the present invention can be moved in any desired direction, for example, laterally as shown by arrow 38, in order to record motion during the simultaneous exposure event. In addition, the flexible array may be attached to a track to maintain the proper optical axis orientation of each module as the array is pushed or pulled to introduce motion blur along a tracking path that is nonlinear and noncircular. The motion blur helps smooth the transition from frame to frame when the motion picture image is reconstituted for viewing by the human eye.

Figure 4:
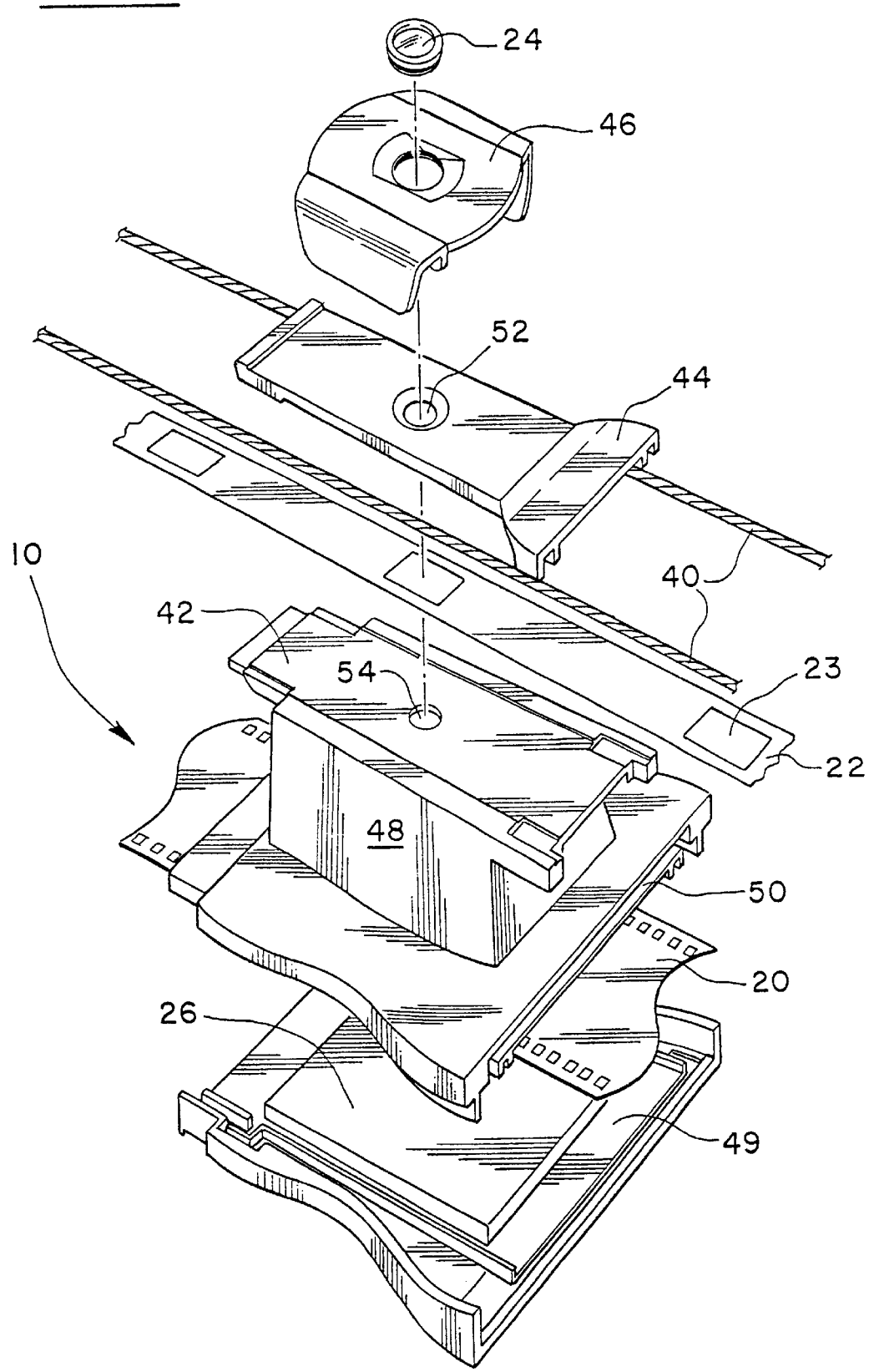
FIG. 4 shows an exploded perspective view of a camera of the present invention.
Figure 5:
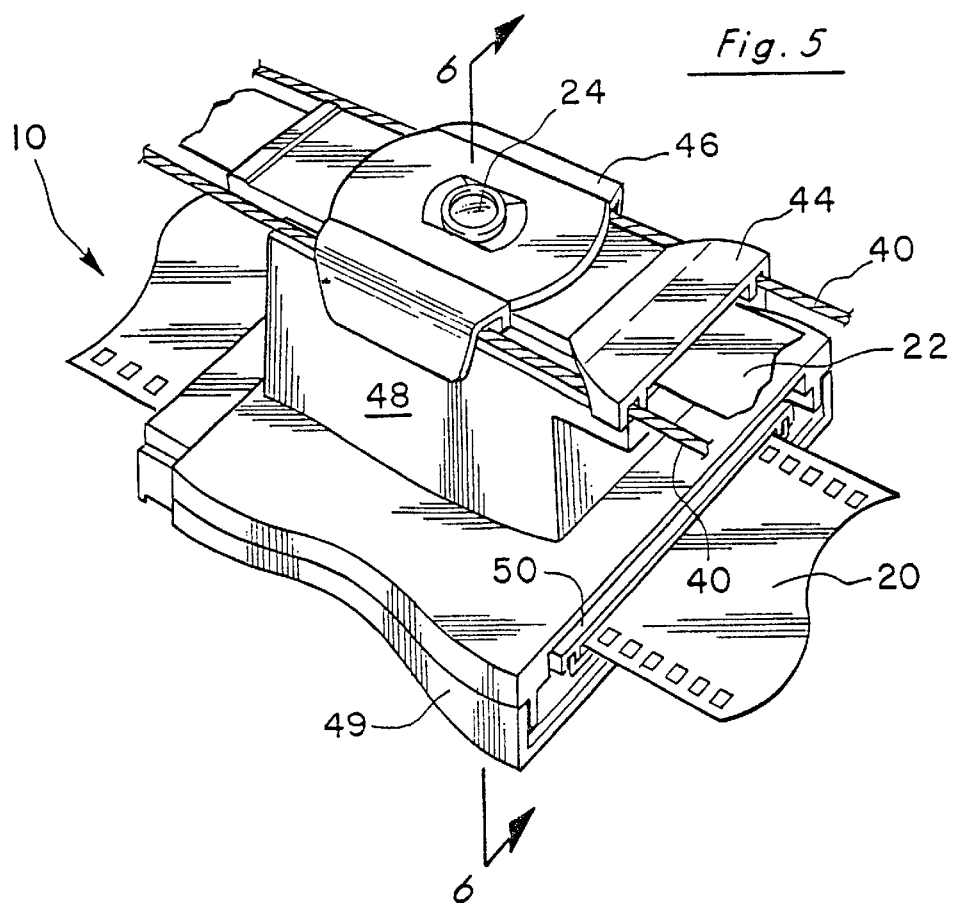
FIG. 5 is a perspective view of the camera of FIG. 4.

FIGS. 4 and 5 show a single camera 10 of the present invention. The array of cameras 10 is held tightly together by the tension cables 40, which run through the entire array parallel to and in the same plane as the shutter 22. The shutter 22 is located in a shutter guide 42. The top of the shutter guide 44 serves both to hold the shutter 22 in the shutter guide 42 and to guide the flexible tension cables 40 that hold each camera 10 in place in the array. The lens holder 46, while fulfilling its primary role of supporting the lens 24, also acts to guide and secure the tension cables 40 to the camera body. The body 48 of the camera 10 is fitted onto a base 49 having the focal plane 26 therein. A film guide 50 placed between the body 48 and the focal plane 26 holds the film 20 in the correct position against the focal plane 26. The top of the shutter guide 44 and the shutter guide 42 each contain an aperture 52, 54 directing the light path 28 from the lens 24 to the focal plane 26.

Simultaneity of the shutter 22 release for each camera 10 is achieved in the preferred embodiment by means of a PTFE-coated strip of semi-rigid opaque black film having identical shutter openings 23 cut at intervals equal to the distance between the equidistant lenses of the cameras. This shutter strip 22 travels freely along a path parallel to the film path inside the cameras 10, passing through each camera 10 through the shutter guide 42 on a plane between the camera's lens 24 and aperture 54. The simultaneous exposure event occurs when the shutter strip 22 is pulled a distance less than the distance between two shutter openings 23 (provided this movement starts and stops with the shutter openings 23 out of alignment with the camera apertures 54), so that exactly one shutter opening 23 passes in front of each aperture 54 during the event being recorded. This results in a simultaneous and identical time-length exposure of the film 20 inside each of the cameras 10 in the array. The shutter strip 22 could be pulled by, for example, a spring-loaded pneumatic cylinder 36 as discussed above and illustrated in FIG. 3. It should be understood that other systems of shutters providing simultaneity will be evident to those skilled in the art. After each simultaneous exposure event, the film 20 contained inside the array of cameras 10 is advanced into the second magazine 32, pulling a fresh strip of unexposed film 20 out of the first magazine 30 and into the array of cameras 10, which are then ready for the next simultaneous exposure event.

Figure 6:
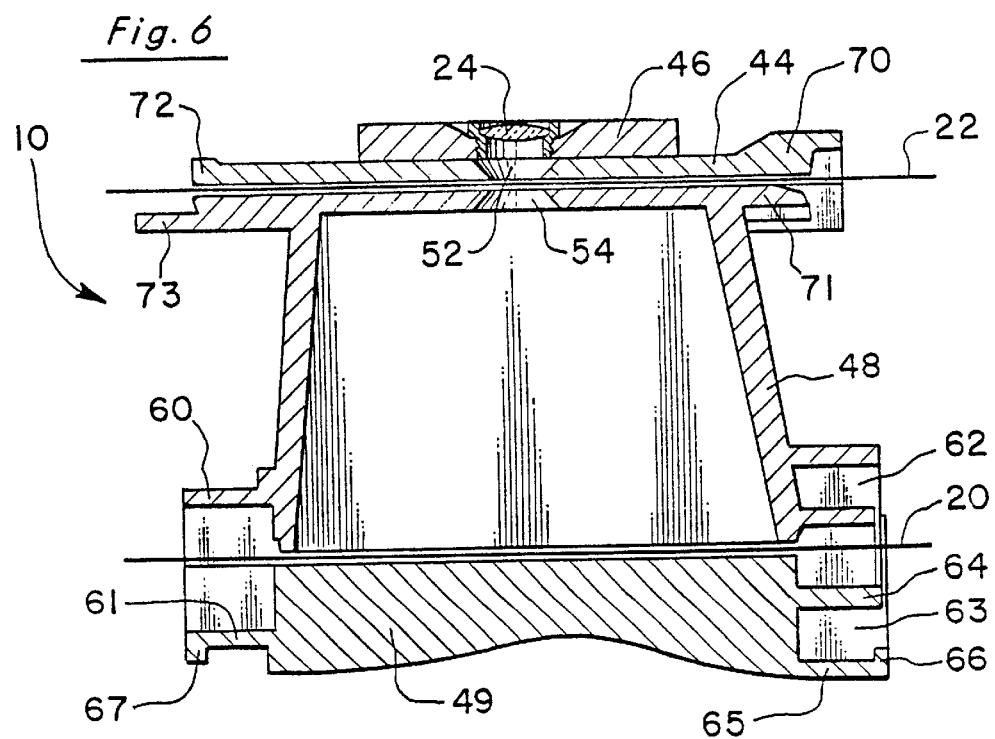
FIG. 6 is a cross-sectional view of the camera of FIG. 5.

The light-tight coupling between cameras 10 comprises a telescoping, double-overlapping light-tight connection, as shown in FIGS. 6 and 7(a) and 7(b). At one side of the camera 10 are found two flanges 60 and 61 on either side of the film 20 that are inserted in corresponding spaces 62 and 63 on an adjacent camera 10 as shown in FIG. 7(a). The size of spaces 62 and 63 is exaggerated in the figures for ease of viewing. Space 63 is formed by two flanges 64 and 65. Flange 61 has at its outermost edge an outward-protruding lip 67. Flange 65 has at its outermost edge an inward-protruding lip 66. When two cameras 10 are situated adjacently as shown in FIG. 7(a), the outward-protruding lip 67 fits into space 63 over flange 65 and the inward-protruding lip 66, forming a light-tight connection beneath the path of the film 20. Another light-tight connection is formed by the insertion of flange 60 into space 62 above the path of the film 20. A further light-tight flexible joint is formed on the shutter plane around the shutter strip 22 by the juxtaposition of flanges 70, 71, 72, and 73.

A further advantage of the light-tight connections described above for the preferred embodiment of the present invention is their ability to remain light-tight when the array of cameras 10 is deployed on an arc or circle as described above in FIG. 1 and as shown in more detail FIG. 7(b). FIG. 7(a) shows the array deployed on a straight line, whereas FIG. 7(b) illustrates the changes that occur when the array of cameras 10 is curved on an arc. As the shutter 22 moves a distance A (as shown by arrows 74), the outward-protruding lip 67 moves a distance B (as shown by arrows 75) until it abuts the inward-protruding lip 66, at which point further telescoping of the connection is prevented. The overlapping lips 66 and 67 maintain the light-tight integrity of the connection during the deployment of the cameras 10 on an arc.

FIGS. 8(a) and 8(b) illustrate the images recorded by a straight-line array of cameras 10. The cameras 10 (80 through 84) are positioned to record a common scene 12. The dotted lines show the light path 28 seen by each camera 10. During a simultaneous recording event, each camera 10 records an image on the strip of film 20, as shown by images 80 through 84 in FIG. 8(b). As a result of the placement of each camera 10 (80 through 84), the perspective of each image 80 through 84 recorded shifts so that when the frames 80 through 84 are viewed in succession in, for instance, a motion picture, the viewer has the impression that a single motion picture camera is moving around the scene 12 while the scene 12 remains frozen in time.

Figure 9:
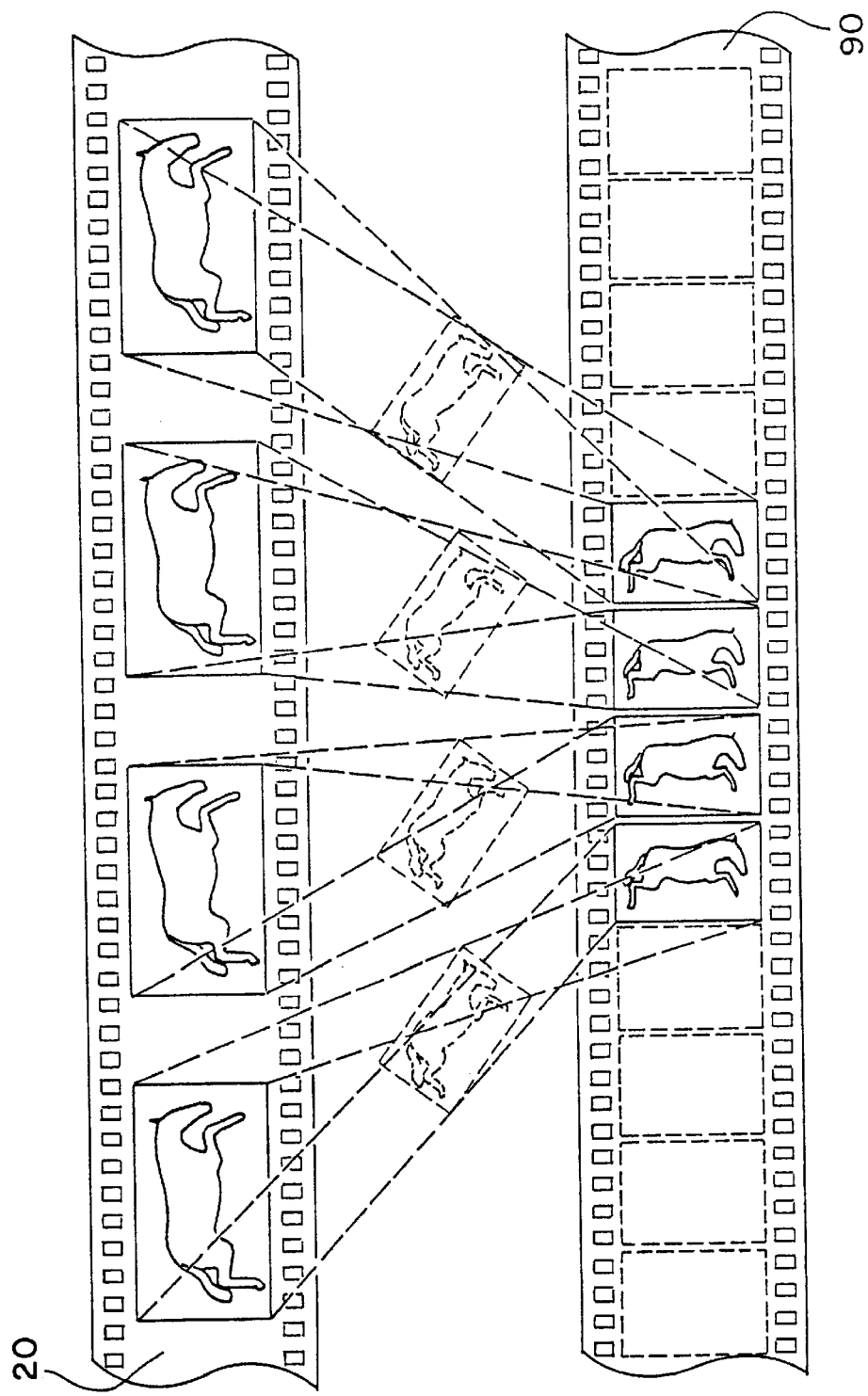
FIG. 9 illustrates how the images produced by the cameras of the present invention are transferred to a strip of motion picture film.
Figure 10:
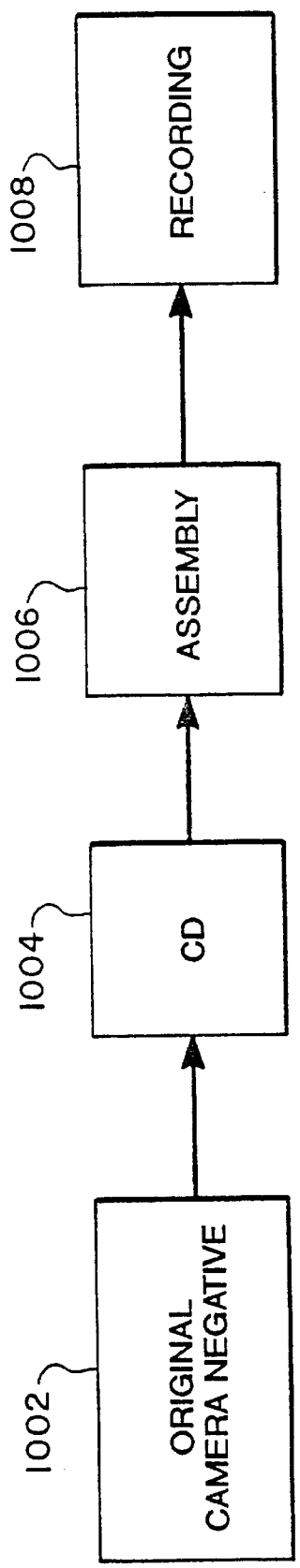
FIG. 10 is a block diagram illustrating the steps taken to produce the virtual camera movement of the present invention.

The process that moves the images recorded by the cameras 10 of the system of the present invention from the film 20 to a motion picture medium, either motion picture film or videotape, is illustrated in FIG. 9. A series of negatives are recorded on the film 20. During the process that moves the negatives from the film 20 to the final motion picture medium, each negative is rotated 90 degrees as shown in FIG. 9 and placed in the order desired on a motion picture or video medium 90 that will eventually be part of a motion picture. The process can be performed by optically transferring and rotating the film negatives in the conventional manner. Alternatively, the process can be performed as illustrated in FIG. 10. An original camera negative 1002 is digitized onto a photo compact disk 1004 (CD). The CD 1004 is then accessed by use of a computer workstation 1006, where the digitized images 1002 are rotated or otherwise manipulated and then assembled to achieve the effect of virtual camera motion. Finally, the assembled images are recorded to motion picture film or videotape 1008. A system currently available for performing the process described above is the Kodak Cineon digital film system of the Eastman Kodak Co., Rochester, N.Y.

It should be noted that other digital storage mediums, such as magnetic or optical disks, could be used to store images in place of photo compact disks. Random access devices, such as magnetic or optical disks, provide great flexibility for the user in selecting, combining, and editing images. Random access devices also facilitate creation of multimedia applications incorporating image sequences. Interactive computer applications often use image sequences in a non-linear manner, unlike conventional motion pictures or videotape.

The present system is capable of recording a series of simultaneous exposure events over time, in addition to recording a single simultaneous exposure event. Specifically, the method, when utilized in rapid succession, records forward-in-time sequences of images that embody a recordation of the advance of time within the scene, as well as lateral-in-space sequences of images that embody a recordation of lateral virtual camera movement. The time base of the lateral virtual camera movement is independent of the time base of the scene itself. Such a time-series of images would present the effect, when selected and sequenced into a motion picture or video medium as described in more detail below, of showing advancing time in the scene in addition to lateral virtual camera motion.

Figure 11:
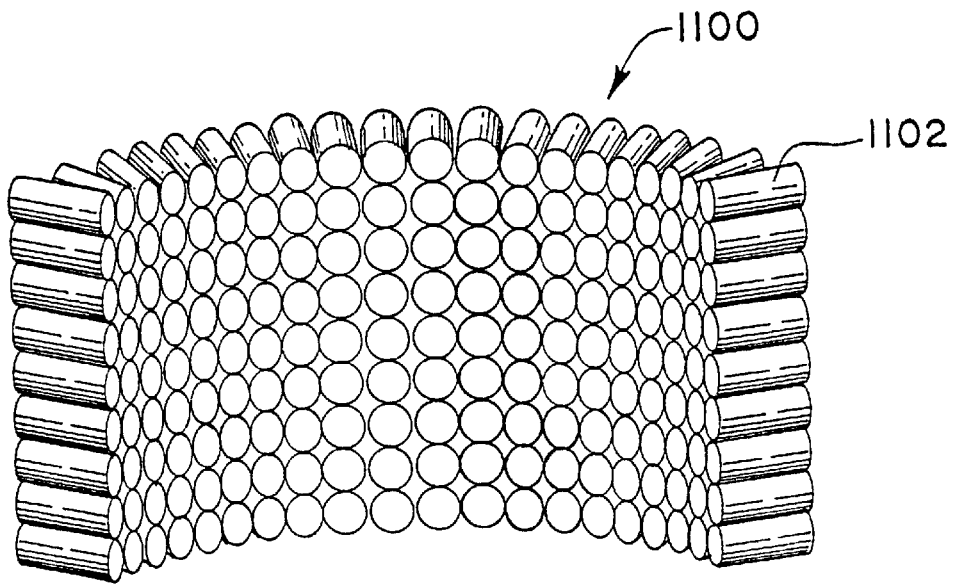
FIG. 11 is a perspective view of the second embodiment of the series of cameras of the present invention.

A second embodiment of the present invention is illustrated in FIGS. 11 through 14. The apparatus of the second embodiment employs an array of video cameras 1100 as shown in FIG. 11 capable of recording a plurality of photographic images of a scene from a plurality of positions simultaneously and synchronously in rapid succession over time. Compared with the first embodiment, the user can choose any sequence of images desired from the array of recorded images. This provides the user with complete flexibility to combine images from any of the cameras in the array 1100, including sequences recorded along a path within the camera array at a fixed point in time, as in the first embodiment. For example, the user can select a sequence of fixed-in-time images from a single row or column of individual cameras or any other desired pattern available within the array shown in FIG. 11. The user can also select forward-in-time sequences of images from selected cameras, or backward-in-time sequences, or any other combination of fixed-in-time and time-sequence images. This embodiment allows user-controllable virtual camera movement with the respect to the scene as time advances.

Figure 12:
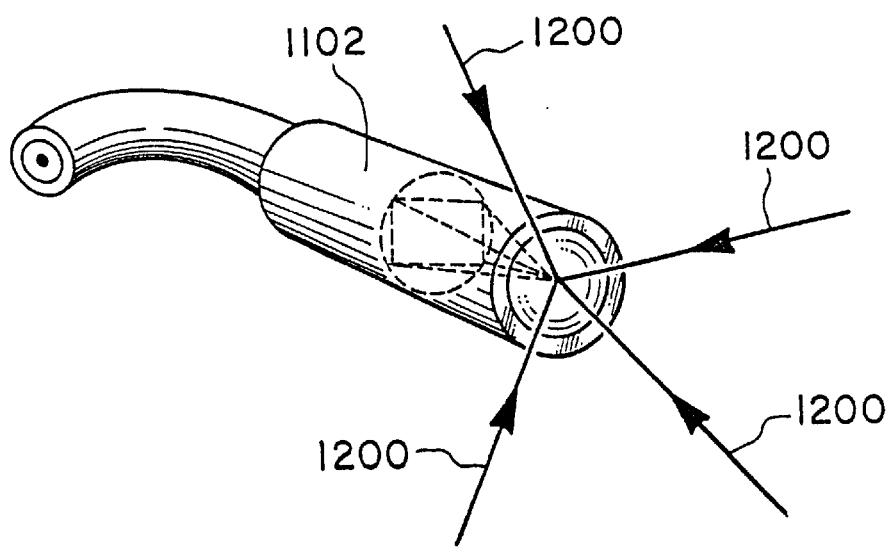
FIG. 12 is a perspective view of one camera of the second embodiment of the present invention showing the lens angles.
Figure 13:
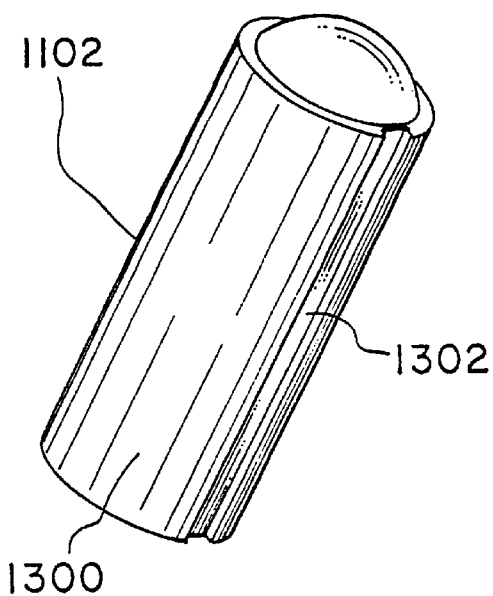
FIG. 13 is a perspective view of one camera of the second embodiment of the present invention.
Figure 14:
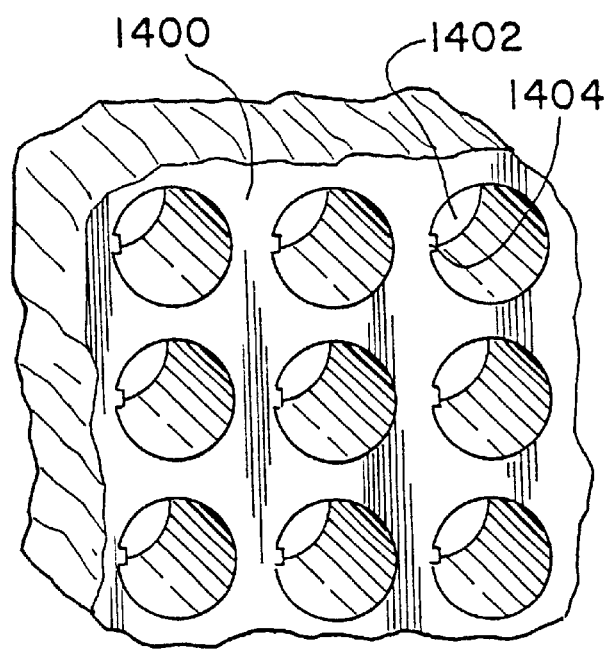
FIG. 14 is a perspective view of a portion of the receptacle for the cameras of the second embodiment of the present invention.

Each individual video camera 1102, illustrated in FIG. 12, captures an extremely wide field of view, as shown by arrows 1200, that is recorded digitally and that can be electronically zoomed, panned, and tilted, or otherwise edited as desired after recordation. To form the array of video cameras, each individual camera 1102 is mounted in a receptacle 1400 as shown in FIG. 14 having a plurality of holes 1402 cut therein to receive the cameras 1102. Each hole 1402 has a tongue 1404 extending toward its center that matches a corresponding groove 1302 cut into the casing 1300 of each video camera 1102, as can be seen in FIG. 13. The tongue-and-groove arrangement both secures the cameras 1102 and aligns them all at the same predetermined degree as a benchmark for the image recorded from each camera 1102. The receptacle 1400 is formed of a flexible material that can be bent into a desired shape depending on the effect to be achieved, for example, an arc as shown in FIG. 11.

This flexibility enables the system of the second embodiment of the present invention to generate virtual camera movement in nearly any direction rather than simply along a linear path as described above for the preferred embodiment. Here again, the entire array of images can be stored on a random access storage device to simplify selection, editing and sequencing by the user.

The above disclosure sets forth a number of embodiments of the present invention. Other arrangements or embodiments, not precisely set forth, could be practiced under the teachings of the present invention and as set forth in the following claims.

I claim:

1. A motion picture made by a process comprising the steps of:

providing an array of cameras deployed along a preselected path with each camera focused on a common scene;

triggering each of the cameras to substantially simultaneously record a still image of the scene;

transferring the still images in a preselected order along the path into a time-sequence of frames; and outputting the time-sequence of frames in a motion picture medium, thereby creating the illusion that a single motion picture camera has moved along the path.

2. The motion picture of claim 1 wherein at least one camera comprises a video camera.

3. The motion picture of claim 1 wherein the cameras record the images on photographic film.

4. The motion picture of claim 1 wherein the motion picture medium comprises a video storage medium.

5. The motion picture of claim 1 wherein the motion picture medium comprises motion picture film.

6. The motion picture of claim 1 wherein the array of cameras is two dimensional.

7. The motion picture of claim 1 wherein the still images are transferred in the form of digital data in a preselected order along the path into the time-sequence of frames.

8. A motion picture made by a process comprising the steps of:

providing an array of cameras deployed along a preselected path with each camera focused on a common scene;

triggering each of said cameras to substantially simultaneously record a still image of the scene;

transferring the still images from the cameras into a digital data format;

transferring the digital data into a time-sequence of frames; and outputting the time-sequence of frames in a motion picture medium, thereby creating the illusion that a single motion picture camera has moved along the path.

9. The motion picture of claim 8 wherein at least one camera comprises a video camera.

10. The motion picture of claim 8 wherein the cameras record the images on photographic film.

11. The motion picture of claim 8 wherein the motion picture medium comprises a video storage medium.

12. The motion picture of claim 8 wherein the motion picture medium comprises motion picture film.

13. The motion picture of claim 8 wherein the array of cameras is two dimensional.

* * * * *